Oct. 3, 1961 D. H. MacDONALD ET AL 3,002,384
FLOW METER
Filed Sept. 19, 1957 2 Sheets-Sheet 1
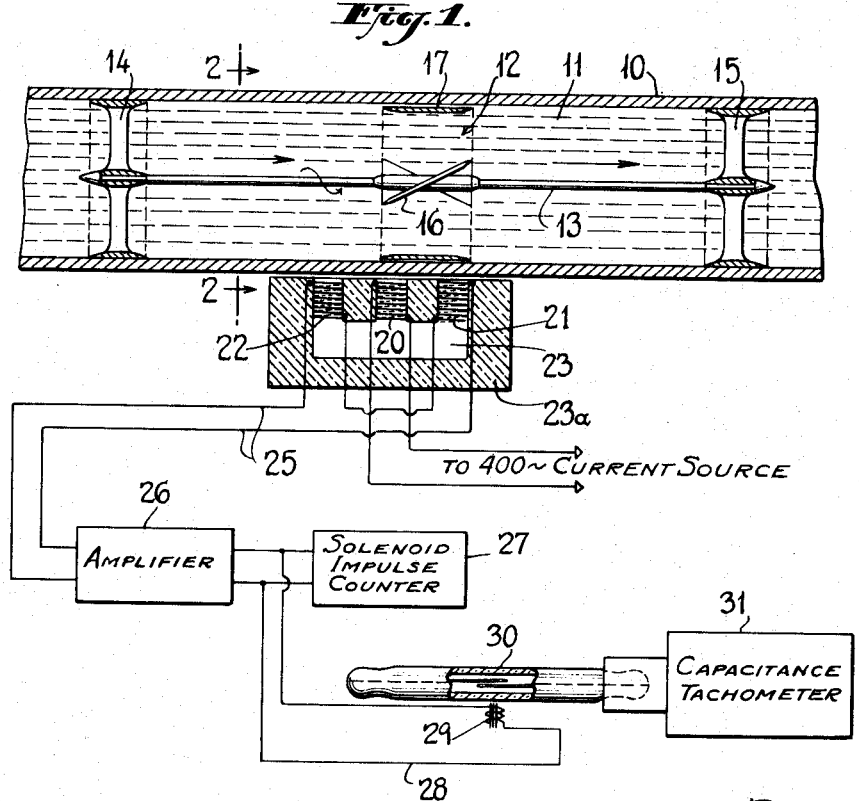
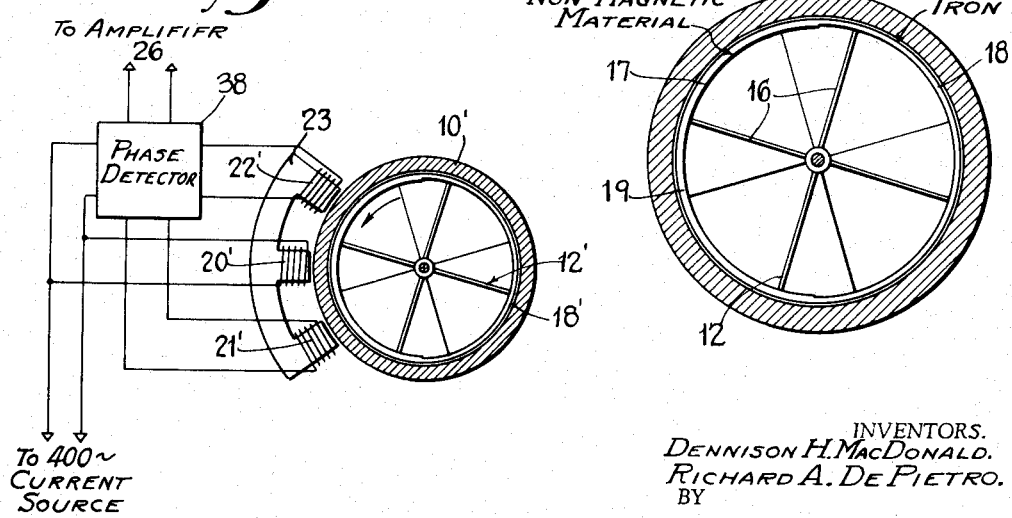
INVENTORS.
DENNISON H. MacDONALD.
RICHARD A. DE PIETRO.
BY
Ward, Neal, Haselton, Orme & McElhannon
ATTORNEYS.

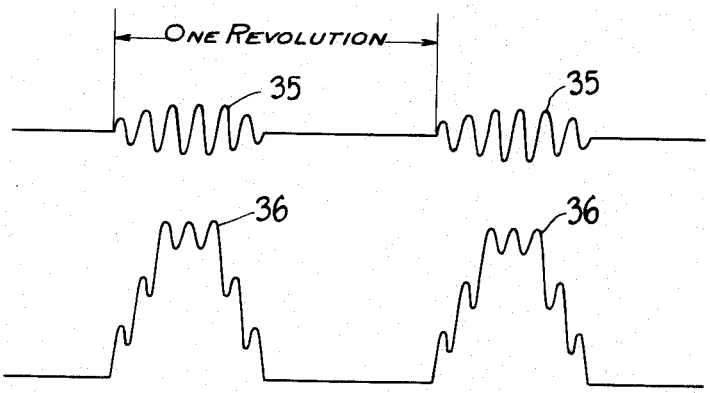
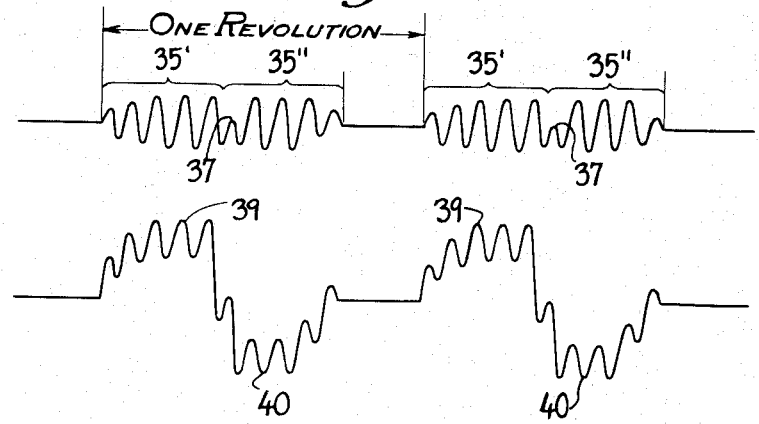

United States Patent Office 3,002,384
Patented Oct. 3, 1961

3,002,384
FLOW METER
Dennison H. MacDonald, East Haven, and Richard A. De Pietro, East Hartford, Conn., assignors to Revere Corporation of America, Wallingford, Conn., a corporation of New Jersey
Filed Sept. 19, 1957, Ser. No. 684,975
5 Claims. (Cl. 73—231)

This invention relates to flow meters of a type particularly adapted among other possible uses for the measurement of the quantity and rate of flow of fluids through a conduit or the like.

While many different types of flow meters have been devised for the general purposes above indicated, yet they all have certain shortcomings, especially when applied to certain specific uses. For example, some are unduly complicated, bulky, delicate or expensive and others are inaccurate. Certain types, if electrically operated, are subject to errors due to the picking up of stray field effects or due to variations in the voltage or other characteristics of the current supplied thereto, or they may require a type of current source not readily available under the conditions of use, as on vehicles or in airplanes. Still others when actuated by an impeller located in the stream of fluid to be measured, will cause an excessive modification of the flow of fluid such as by causing a reaction tending variably to interfere with such flow.

In accordance with the present invention, a flow meter is provided of a construction which is well adapted for use in a variety of different situations and which substantially avoids the above-noted shortcomings of prior devices for the purpose.

According to the present invention, an electromagnet supplied with a suitable alternating current, is positioned to maintain a magnetic field extending into the path of the fluid flow. This magnet is accompanied by two other electromagnets preferably but not necessarily having core means with parts common to that of the first magnet. These two other magnets have windings which in effect are secondaries of a transformer, whereas the winding of the first electromagnet is in effect a primary. The secondaries are designed and positioned normally and are so connected as to be matched and balanced, that is, so that the current which tends to be generated in one secondary winding at any moment will be equal to and be counteracted by that which tends to be generated in the other secondary winding and thus no current will flow through the secondary windings. And any currents which tend to be generated in the secondaries due to stray fields effects, will also be balanced out. An impeller is located in and is adapted to be rotated by the stream of fluid to be measured and this impeller carries a non-symmetrical or an eccentrically positioned element of magnetic material such as soft iron for example positioned to circulate in a path, a portion of which path passes through the field as maintained between the primary and at least one of the secondaries, so that such field will be altered each time the said element passes through such field, thereby causing a current to be generated in one of the secondaries different from that being generated in the other. Accordingly, with the two secondaries connected in the same circuit, this will result in the generation of impulses in such circuit, which will be of a frequency varying with the speed of rotation of the impeller. Such impulses may be counted to give a measure of the total quantity of fluid flowing past or through the impeller and the frequency of the impulses may be measured to give a measure of the rate of flow of the fluid past the impeller.

One or more of the soft iron elements may be mounted on the impeller, depending upon the preferred frequency of the impulses which are to be counted, and it will be understood that materials other than soft iron but capable of substantially altering the magnetic field, may be used. The arrangement is such that the rotating element or elements on the impeller act to modify with a relay or switch effect the magnetic field at one of the secondaries rather than acting substantially to generate current in such secondary. Thus any reaction of the arrangement on the impeller tending to check its speed is minimized and as a result reactions against the fluid flow are minimized. To this end, the primary electromagnets and the secondary which is to be affected by the magnetic element, are preferably located with a loosely coupled or somewhat spaced relationship with respect to the path of travel of the magnetic element on the impeller.

Various further and more specific objects, features and advantages of the invention will appear from the description given below, taken in connection with the accompanying drawings, illustrating by way of example preferred forms of the invention.

In the drawings:

FIG. 1 is a somewhat schematic diagram of a preferred arrangement of the apparatus of the invention;

FIG. 2 is a sectional view taken substantially along line 2—2 of FIG. 1;

FIG. 3 is a graph indicating a typical wave form as shown by an oscillograph, of the current which will flow in the circuit of the secondaries when the flow meter is in operation;

FIG. 4 is a transverse sectional view of an alternative embodiment of the invention; and FIG. 5 is a view similar to that of FIG. 3, but showing the response obtainable with the embodiment of FIG. 4.

Referring now to FIG. 1 in further detail, a conduit portion is indicated at 10 formed of non-magnetic material and through which a stream of fluid 11 is flowing. For example, such fluid may comprise a supply of liquid fuel for any desired purpose. An impeller 12 is rotatably mounted in the fluid stream, preferably coaxial therewith and upon a shaft as at 13 carried as by suitable supports 14, 15. The impeller may be arranged either to rotate about the shaft 13, or the shaft 13, if preferred, may be arranged to rotate in bearings mounted in the supports therefor.

The impeller includes preferably a plurality of blades as at 16 and these are preferably surrounded by a cylinder 17 affixed at their peripheries. Preferably as shown in FIG. 2, a portion of the cylinder 17, for example the portion as at 18 extending over an arc of 180°, is formed of magnetic material, for example of soft unmagnetized sheet iron, whereas the remainder of the cylinder as at 19 is formed of a non-magnetic material such as brass. The portions 18 and 19 respectively are preferably made of different thicknesses, such that one side of the cylinder or of the whole impeller assembly will be balanced as compared with the other side, or of course the impeller assembly could be balanced with respect to its axis in other known ways.

An electromagnet 20 is mounted preferably outside the conduit 10, but adjacent thereto and in a position such that the magnetic field established thereby will be intersected by the soft iron member 18 on the impeller each time the impeller rotates. The electromagnet 20 in effect comprises a primary of a transformer as hereinabove indicated, and it is accompanied by two secondaries in the form of electromagnets 21 and 22 which preferably have cores, as does the magnet 20, which comprise integral extensions from a core piece 23 common to all three magnets. The magnet assembly may be mounted or cast in a suitable body of insulation as at 23a. The core piece may be formed of laminated iron in the conventional way for alternating current electromagnets. Preferably the primary 20 and the two secondaries 21 and 22 are all alike, or at least the secondaries 21 and 22 have windings and are shaped and positioned so that normally in the absence of the impeller, the electromagnet 20 will tend to cause substantially equal and opposite currents to flow in leads 25, the windings of the secondaries being connected, as indicated, in series and one in opposition to the other. Thus the secondaries if subjected to the field from the primary as well as any stray magnetic fields, will tend to generate equal and opposite currents, one balanced against the other, so that the leads 25 running to an amplifier 26 will normally carry no current when the soft iron element 18 on the impeller is remote from the fields of primary 20 and secondary 21.

As indicated in FIG. 1, the primary may be supplied with a source of 400 cycle current which has been found suitable and convenient for the purpose, although of course various other frequencies might be used, as may also various voltages and current values. A current of 0.01 ampere at 30 volts has been found suitable, for example. The currents resulting in the leads 25 and as amplified by amplifier equipment 26 of any suitable known type, may be conducted to suitable means of known type for counting the number of impulses occurring in such current. For example, a solenoid impulse counter 27 of known type may be used for this purpose, and the number of impulses thus counted will give a measure of the total amount of fluid which flows in the stream 11 and such counter may, of course, be calibrated by known methods to give readings for example in total gallons of flow. A part of the current from the amplifier may also be conducted through leads 28 to a solenoid 29 acting to actuate for example a magnetically responsive switch means 30 which may for example be a small glass-enclosed switch, the terminals of which are connected to a suitable known type of device for measuring the rate of the occurrence of impulses, for instance, a known type of capacitance tachometer 31. This will give readings providing a measure of the rate of flow of the fluid in the stream 11, or more specifically, the rate of rotation of the impeller, and this instrument may also be calibrated by known methods to give readings in terms for example of gallons per hour.

The operation of the arrangement may be more specifically described as follows. The primary 20 will normally maintain an alternating electromagnetic field enveloping the secondaries 21 and 22 and tending to generate equal currents in the winding thereof, so that such currents as connected in opposition, are balanced out, as are also any currents arising from stray electromagnetic fields which will ordinarily affect the secondaries equally as they are relatively close together. However, since the periphery of the impeller carrying the soft iron or other magnetic element 18 is located closer to the secondary 21 than to the secondary 22, the result will be that each time such magnetic element 18 comes around to intersect the field between magnets 20 and 21, the flux density or strength of the field between these two magnets will be increased, thereby causing generation of an impulse in secondary 21 over-balancing the current from secondary 22. These impulses which are applied to the input of the amplifier 26 over leads 25, will take the form indicated for example at 35 in FIG. 3, as may be shown by connecting the leads 25 to an oscillograph. That is, each wave train 35 shown in FIG. 3 represents the voltage between the leads 25 caused by the intersection of the magnetic field between magnets 20 and 21 by the magnetic element on the impeller. The output voltage of the amplifier 26 may take the form designated by the numeral 36 in FIG. 3, the small variations in the amplitude of the wave forms being due to the use of alternating current from the source of supply, for example, a 400 cycle supply, and incomplete filtering.

Thus, when the impulses 36 are counted, the total will give a measure of the number of revolutions of the impeller and consequently a measure of the total quantity of fluid which flows past the impeller. Also, the measurement of the frequency of the impulses 36, as by the tachometer means, will give a measure of the rate of rotation of the impeller and thus, also the rate of flow of fluid past the impeller.

The embodiment of the invention shown in FIG. 4, as to its general aspects, is similar to that of FIG. 1, but here instead of arranging the electromagnets longitudinally of the path of fluid flow through the impeller, they are arranged circumferentially about the conduit as indicated at 20', 21' and 22'. Thus with this arrangement, as a magnetic element 18' on the impeller 12' rotates around in the direction of the arrow shown, and comes into the field of magnets 22' and 20', it will first cause strengthening of this field as compared with the magnetic field between magnets 20' and 21', thereby producing, for example, impulses having the wave form indicated at 35' in FIG. 5, in the connected circuit. Then as the element 18' passes on into the field between magnets 20' and 21', it will cause another impulse as at 35" to occur in the connected circuit. The circuit connections to the magnets of the embodiment of FIG. 4 may be like those of the arrangement of FIG. 1, provided that the response rates of the counter and tachometer are such that only one impulse is registered for the occurrence of both impulses 35' and 35", or if the circuit arrangements are so made that each impulse of each pair is counted as a separate impulse, then the calibration of the indicating instruments may be such as to give such readings as to take into account the fact that twice as many impulses are generated as there are revolutions of the impeller.

On the other hand, it will be noted from an examination of FIG. 5 that a voltage phase reversal occurs at the points 37 in the wave trains so that it is possible to convert the impulses 35" into impulses having a polarity opposite to impulses corresponding to the impulses 35' by inserting a well known type of phase detector 38 between the outputs of the secondaries 21' and 22' and the input of the amplifier 26 as indicated in FIG. 4. The output impulses of the phase detector 38 will have the form indicated at 39 and 40 in FIG. 5, impulse 39 corresponding to impulse 35' and impulse 40 corresponding to impulse 35". When impulses of the type indicated at 39 and 40 in FIG. 5 are applied to the input of the amplifier 26, the output of the amplifier 26 may be unidirectional impulses having substantially the wave form indicated by the numeral 36 in FIG. 3, each impulse 36 corresponding to each impulse 39 and the impulses 40 producing no corresponding impulses in the output of the amplifier 26. Accordingly, with the circuit arrangements indicated in FIG. 4, the counter 27 and the tachometer 31, with its associated devices, will be actuated in the manner described above in connection with FIG. 1.

The arrangement of FIG. 4 may in some cases be of advantage as being less likely to give responses as the result of surrounding irregular stray field effects.

In addition to overcoming or minimizing various shortcomings of prior types of apparatus for the purpose as above explained, it may be noted that the present invention has a further advantage which may under various circumstances be quite important. That is, the signals or impulses which the instrument furnishes to the indicating instruments will be of substantially constant level (assuming that the input voltage is substantially constant) and it is necessary for the indicating instruments to distinguish between only the presence or absence of an impulse. Thus, certain difficulties in amplifying or in obtaining indications from signals which indicate different rates of flow by differences in amplitude are avoided. Even if the input voltage should vary within reasonable limits with the apparatus of the invention, still the accuracy of the counting, which is dependent substantially only on the frequency of the produced impulses (as at 35, 35', 35'') will not be interfered with in any way because the frequency and number of the impulses, which provide the desired indications, do not vary even if the input voltage or other characteristics of the source of current used do vary within reasonable limits.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A flow meter comprising in combination: a conduit portion through which the flow to be metered is to pass, a rotatable impeller mounted in said conduit portion and having a predetermined axis of rotation; an element mounted on said impeller and formed of a material which will substantially alter the characteristics of a magnetic field when such element traverses such a field, said element having a portion spaced from said axis and being discontinuous in a direction extending around said axis; a first winding forming the primary of a transformer and adapted to be connected to an electrical energizing source; and two other windings in magnetically coupled relation to said primary; said first winding and said other windings being spaced from each other and being mounted in positions substantially equi-distant from said axis and said primary and at least one of said other windings being mounted in positions adjacent the path of travel of said element such that when said element, upon rotation of the impeller, passes adjacent said one winding and said primary, the magnetic path therebetween will be altered, thereby causing a current to be generated in said one winding different from that generated in the other of said windings.

2. A flow meter comprising in combination: a primary winding adapted to be supplied with alternating current; first and second secondary windings adjacent to said primary winding and spaced from said primary winding and from each other, said secondary windings being of a matched construction and arrangement with respect to the primary winding whereby normally the current which tends to be induced in one is substantially equal to the current induced in the other; a rotatable impeller adapted to be mounted in a fluid stream to be metered and mounted with its axis of rotation substantially equi-distant from both said primary winding and said secondary windings; an element of magentic material mounted on said impeller at a position such that as the impeller rotates, said element will periodically traverse the magentic field path between the primary winding and one of said secondary windings but will be spaced during at least a portion of the traversal of said magnetic field path from the magnetic field path between said primary winding and the other of said secondary windings and thereby will alter said field path between said primary winding and said one secondary winding as compared with the field path between said primary winding and said other secondary winding.

3. A flow meter comprising in combination: a conduit portion through which the flow to be metered is to pass, a rotatable impeller mounted in said conduit portion and having a predetermined axis of rotation; an element mounted on said impeller and formed of a material which will be substantially alter the characteristics of a magnetic field when such element transverses such a field, said element having a portion spaced from said axis and being discontinuous in a direction extending around said axis; a first winding forming the primary of a transformer and adapted to be connected to an electrical energizing source; and two other windings in magnetically coupled relation to said primary, said first winding and said two other windings being spaced from each other in the direction of said axis with said two other windings substantially symmetrically disposed on opposite sides of said first winding and being mounted in positions outside of said conduit and substantially equi-distant from said axis and said primary and one of said two other windings being mounted in positions adjacent the path of travel of said element such that when said element, upon rotation of the impeller, passes adjacent said one winding and said primary, the magnetic path therebetween will be altered, thereby causing a current to be generated in said one winding different from that generated in the other of said two windings.

4. A flow meter comprising in combination: a conduit portion through which the flow to be metered is to pass, a rotatable impeller mounted in said conduit portion and having a predetermined axis of rotation; an element mounted on said impeller and formed of a material which will substantially alter the characteristics of a magnetic field when such element traverses such a field, said element having a portion spaced from said axis and being discontinuous in a direction extending around said axis; a first winding forming the primary of a transformer and adapted to be connected to an electrical energizing source; and two other windings in magnetically coupled relation to said primary, said first winding and said other windings being spaced from each other in a direction circumferentially of said axis with said two other windings substantially symmetrically disposed on opposite sides of said first winding and being mounted in positions substantially equi-distant from said axis and outside of said conduit and said windings being mounted in positions adjacent the path of travel of said element such that when said element, upon rotation of the impeller, alternately passes adjacent one of said two other windings and said primary and the other of said two other windings and said primary, the magnetic path therebetween will be altered, thereby causing current impulses to be generated alternately in said two other windings.

5. A flow meter comprising in combination: a conduit portion through which the flow to be metered is to pass, a rotatable impeller mounted in said conduit portion and having a predetermined axis of rotation; an element mounted on said impeller and formed of a material which will substantially alter the characteristics of a magnetic field when such element traverses such a field, said element having a portion spaced from said axis and being discontinuous in a direction extending around said axis; a first winding forming the primary of a transformer and adapted to be connected to an electrical energizing source; two other windings in magnetically coupled relation to said primary, said first winding and said other windings being spaced from each other in a direction circumferentially of said axis with said two other windings substantially symmetrically disposed on opposite sides of said first winding and being mounted in positions substantially equi-distant from said axis and outside of said conduit and said windings being mounted in positions adjacent the path of travel of said element such that when said element, upon rotation of the impeller, alternately passes adjacent one of said two other windings and said primary and the other of said two other windings and said primary, the magnetic path therebetween will be altered, thereby causing current impulses of opposite phase to be generated alternately in said two other windings; and phase detector means connected to said windings for converting said current impulses of opposite phase to current impulses of opposite polarity.

References Cited in the file of this patent

UNITED STATES PATENTS 2,291,198    Alneas _____ July 28, 1942

(Other references on following page)

UNITED STATES PATENTS

| | | |
|---|---|---|
| 2,436,683 | Wood | Feb. 24, 1948 |
| 2,467,582 | Corkran | Apr. 19, 1949 |
| 2,587,664 | Stout | Mar. 4, 1952 |
| 2,629,859 | Taylor | Feb. 24, 1953 |
| 2,683,224 | Cole | July 6, 1954 |
| 2,728,893 | Bartelink | Dec. 27, 1955 |
| 2,767,582 | Bartelink | Oct. 23, 1956 |

FOREIGN PATENTS

| | | |
|---|---|---|
| 745,357 | Great Britain | Feb. 22, 1956 |
| 758,755 | Great Britain | Oct. 10, 1956 |
| 870,919 | Germany | Mar. 19, 1953 |